(12) United States Patent
Okamoto et al.

(10) Patent No.: US 10,793,042 B2
(45) Date of Patent: Oct. 6, 2020

(54) VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Naoya Okamoto, Aichi-ken (JP); Jueru Shimizu, Aichi-ken (JP); Yuji Yamada, Aichi-ken (JP); Osamu Kanayama, Aichi-ken (JP)

(73) Assignees: TOYOTA BOSHOKU KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/400,732

(22) Filed: May 1, 2019

(65) Prior Publication Data
US 2019/0359107 A1 Nov. 28, 2019

(30) Foreign Application Priority Data

May 25, 2018 (JP) .................. 2018-100282

(51) Int. Cl.
*B60N 2/90* (2018.01)
*B60N 2/70* (2006.01)
*B60N 2/02* (2006.01)

(52) U.S. Cl.
CPC .............. *B60N 2/933* (2018.02); *B60N 2/02* (2013.01); *B60N 2/7094* (2013.01)

(58) Field of Classification Search
None
See application file for complete search history.

(56) References Cited

U.S. PATENT DOCUMENTS 3,552,797 A * 1/1971 Houdain .................. A47C 7/42
297/354.1
3,628,465 A * 12/1971 Dobson .................... B61F 5/142
105/191

(Continued)

FOREIGN PATENT DOCUMENTS

GB 610828 A * 10/1948 ............... B60K 1/00
JP S58-097040 U 7/1983

(Continued)

OTHER PUBLICATIONS

Japanese Office Action in counterpart Japanese Patent application No. JP2018-100282, dated Apr. 21, 2020 (and English translation thereof).

*Primary Examiner* — David E Allred
(74) *Attorney, Agent, or Firm* — Greenblum & Bernstein, P.L.C.

(57) ABSTRACT

A vehicle seat installed in a vehicle includes a seatback, a seat cushion, a seat frame, a movable part, a first spring, a second spring, and a preloading device. The first spring is capable of, when the movable part has shifted in a first direction, generating such an elastic force as causes the movable part to shift toward the neutral position. The second spring is capable of, when the movable part has shifted in a second direction, generating such an elastic force as causes the movable part to shift toward the neutral position. The preloading device is configured to change at least one of the elastic force exerted on the movable part by the first spring and the elastic force exerted on the movable part by the second spring.

6 Claims, 7 Drawing Sheets

(56) References Cited

U.S. PATENT DOCUMENTS

| | | | | |
|---|---|---|---|---|
| 3,632,076 | A * | 1/1972 | Rogers, Jr. | B60N 2/39 248/636 |
| 4,225,178 | A * | 9/1980 | Takada | B60N 2/4221 248/561 |
| 7,438,000 | B2 * | 10/2008 | Schneider | B61F 5/22 105/199.1 |
| 8,020,933 | B2 * | 9/2011 | Kim | B60N 2/66 297/284.8 |
| 8,100,471 | B2 * | 1/2012 | Lawall | B60N 2/4279 297/216.1 |
| 9,561,741 | B2 * | 2/2017 | Nagayasu | B60N 2/7094 |
| 9,713,380 | B2 * | 7/2017 | Gehner | A47C 1/03277 |
| 9,975,458 | B2 * | 5/2018 | Takeuchi | B60N 2/39 |
| 10,086,728 | B2 * | 10/2018 | White | B60N 2/0244 |
| 10,202,053 | B2 * | 2/2019 | Gonzalez Uribe | B60N 2/66 |
| 10,391,899 | B2 * | 8/2019 | Ketels | B60N 2/509 |
| 10,493,878 | B2 * | 12/2019 | Ketels | B60N 2/501 |
| 10,532,672 | B1 * | 1/2020 | Pinkelman | B60N 2/504 |
| 10,537,181 | B2 * | 1/2020 | Brodbeck | A47C 7/40 |
| 2009/0261642 | A1 * | 10/2009 | Dickie | A47C 7/14 297/314 |
| 2015/0367756 | A1 * | 12/2015 | Katoh | B60N 2/66 297/285 |
| 2016/0159254 | A1 * | 6/2016 | Katoh | B60N 2/66 297/313 |
| 2019/0241096 | A1 * | 8/2019 | Ito | B60N 2/0232 |

FOREIGN PATENT DOCUMENTS

| | | | | |
|---|---|---|---|---|
| JP | H03-007629 | A | | 1/1991 |
| JP | 07047876 | A * | 2/1995 | ............ B60N 2/067 |
| JP | 07149171 | A * | 6/1995 | ............ B60N 2/39 |
| JP | 2009262800 | A * | 11/2009 | ............ B60N 2/062 |
| JP | 2012096703 | A * | 5/2012 | |
| JP | 2014-151766 | A | | 8/2014 |
| WO | WO2013/021497 | | | 2/2013 |

\* cited by examiner

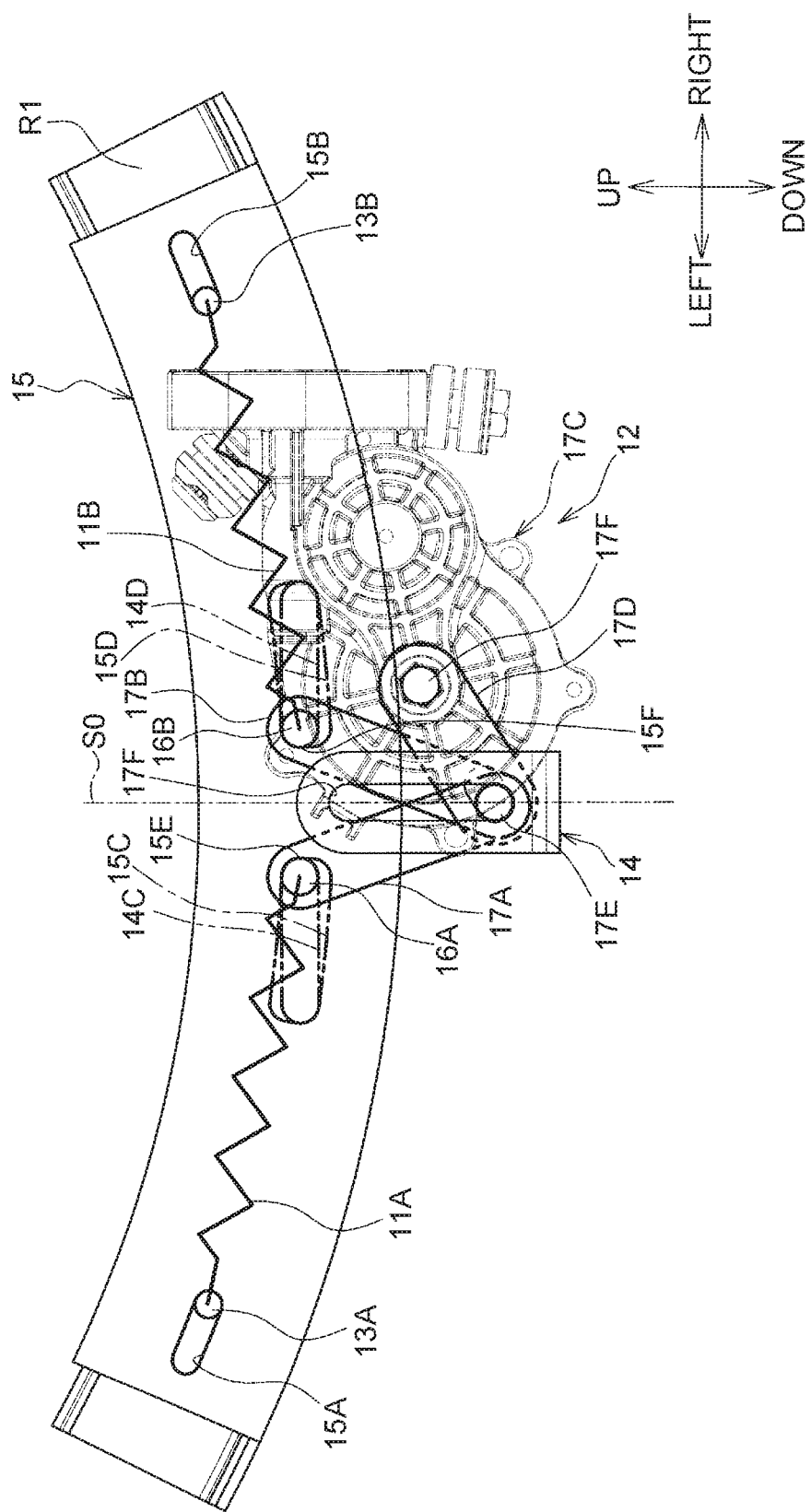

ID BY REFERENCE

VEHICLE SEAT

INCORPORATION BY REFERENCE

The disclosure of Japanese Patent Application No. 2018-100282 filed on May 25, 2018 including the specification, drawings and abstract is incorporated herein by reference in its entirety.

BACKGROUND

1. Technical Field

The present disclosure relates to a vehicle seat having a movable part provided in a part of at least one of a seatback and a seat cushion.

2. Description of Related Art

WO2013/021497 discloses a vehicle seat that allows a seated person to easily maintain his or her posture while the vehicle is turning. This vehicle seat has a movable part in a part of the seatback and the seat cushion. This movable part is a part supporting the seated person and capable of shifting under an inertial force acting on the seated person while the vehicle is turning.

SUMMARY

The present disclosure discloses an example of a vehicle seat that can prevent a movable part from shifting with higher-than-necessary sensitivity.

One aspect of the present disclosure is a vehicle seat including a seatback, a seat cushion, a seat frame, a movable part, a first spring, a second spring, and a preloading device. The movable part is provided in a part of at least one of the seatback and the seat cushion. The movable part is configured to move relative to the seat frame from a predetermined neutral position as the center. The first spring is capable of, when the movable part has shifted in a first direction, generating such an elastic force as causes the movable part to shift toward the neutral position. The second spring is capable of, when the movable part has shifted in a second direction different from the first direction, generating such an elastic force as causes the movable part to shift toward the neutral position. The preloading device is configured to change at least one of the elastic force exerted on the movable part by the first spring when the movable part is in the neutral position and the elastic force exerted on the movable part by the second spring when the movable part is in the neutral position. This configuration can prevent the movable part from shifting with higher-than-necessary sensitivity.

The above vehicle seat may further include a first coupling portion and a second coupling portion. When the movable part has shifted in the first direction, the first coupling portion may shift a first end of the first spring so as to follow the movable part. When the movable part has shifted in the second direction, the second coupling portion may shift a first end of the second spring so as to follow the movable part.

The preloading device may be configured to change at least one of the position of a second end of the first spring and the position of a second end of the second spring. This configuration allows the initial load of at least one of the first spring and the second spring to be easily changed.

The above vehicle seat may further include a shifting member that shifts integrally with the movable part, and a fixed member that is fixed to the seat frame. The preloading device may be configured to restrain the shifting member from shifting relative to the fixed member. Thus, the movable part can be restrained from shifting, and therefore can be prevented from shifting with higher-than-necessary sensitivity.

In the above vehicle seat, the preloading device may include a first adjusting pin to which the first spring is anchored at the second end, a second adjusting pin to which the second spring is anchored at the second end, and a shift mechanism configured to shift the first adjusting pin and the second adjusting pin in the first direction or the second direction.

The shifting member may have a first movable hole which has a shape of an elongated hole and through which the first adjusting pin is inserted, and a second movable hole which has a shape of an elongated hole and through which the second adjusting pin is inserted. The second movable hole may be provided at a position symmetrical to the position of the first movable hole with respect to an imaginary vertical plane including the neutral position.

The preloading device may be configured to, to restrain the shifting member from shifting relative to the fixed member, bring the first adjusting pin into contact with an end of the first movable hole and bring the second adjusting pin into contact with an end of the second movable hole that is an end symmetrical in position to the end of the first movable hole with respect to the imaginary vertical plane including the neutral position. Since the first adjusting pin and the second adjusting pin restrain the movable part from shifting, this configuration can fulfill a locking function of restraining the shifting member from shifting relative to the fixed member.

In the above vehicle seat, the fixed member may have a first fixed hole which has a shape of an elongated hole and through which the first adjusting pin is inserted, and a second fixed hole which has a shape of an elongated hole and through which the second adjusting pin is inserted. The first fixed hole may extend in a direction parallel to the first movable hole. The second fixed hole may be provided at a position symmetrical to the position of the first fixed hole with respect to an imaginary vertical plane including the neutral position.

The shift mechanism may include a first link rotatably coupled at a first end to the first adjusting pin, a second link rotatably coupled at a first end to the second adjusting pin, and an actuator to which the first link and the second link are each rotatably coupled at a second end. The actuator may be configured to shift a portion to which the first link and the second link are coupled, in a direction intersecting a longitudinal direction of the first fixed hole. In this configuration, when the actuator is operated, the first adjusting pin and the second adjusting pin are shifted and thereby the initial load is changed.

In the above vehicle seat, the shift mechanism may include a shaft. The first link and the second link may be each coupled at the second end to the actuator through the shaft. The actuator may be configured to shift the shaft in the direction intersecting the longitudinal direction of the first fixed hole.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a view illustrating the operation of the preloading device according to the first embodiment.

DETAILED DESCRIPTION OF EMBODIMENTS

Figure 1:
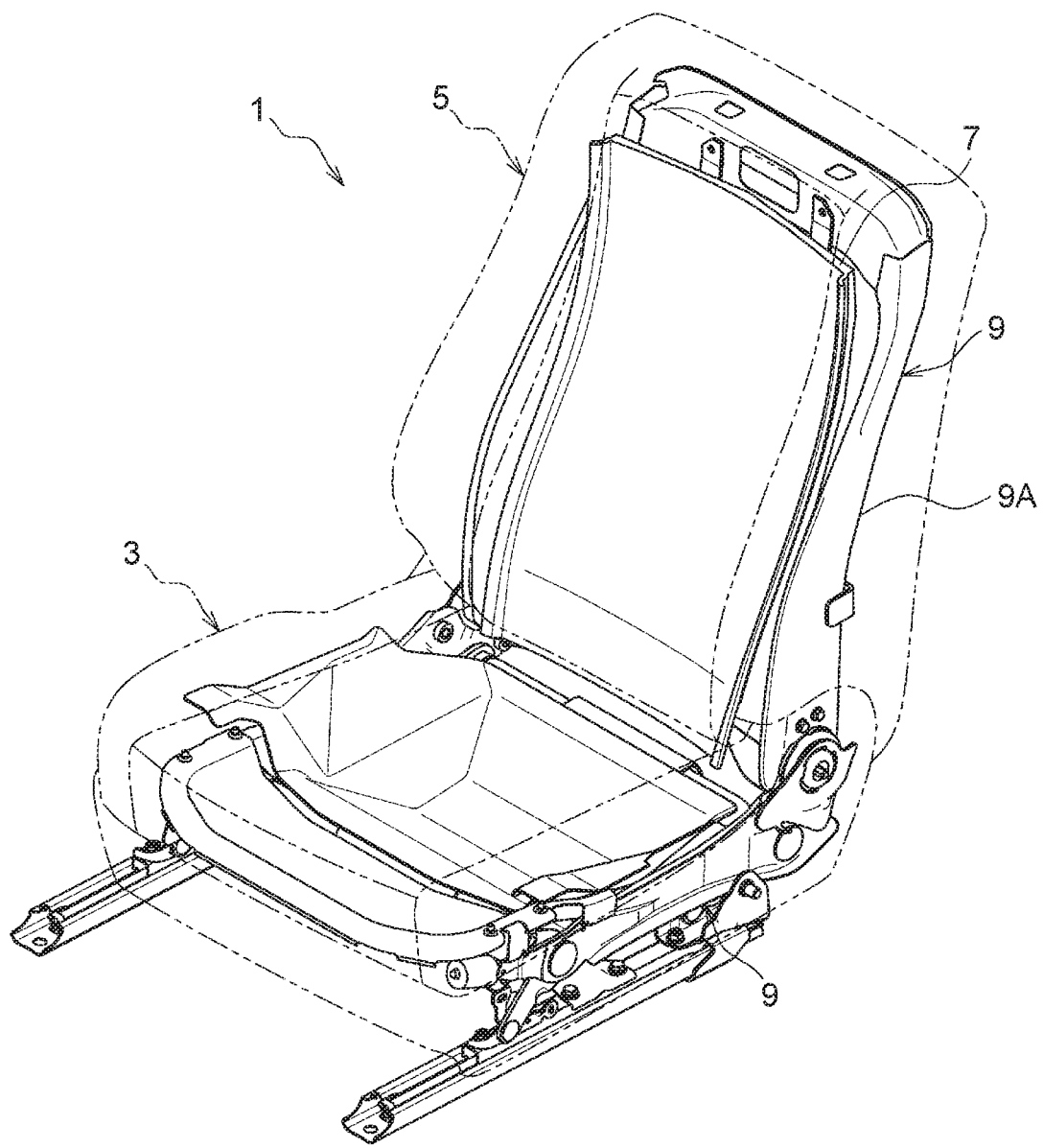
FIG. 1 is a view showing a vehicle seat according to a first embodiment.
Figure 1:
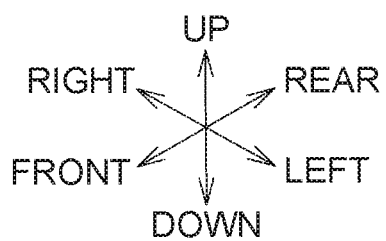

An embodiment of the present disclosure to be shown below represents one example of embodiments belonging to the technical scope of the present disclosure. Thus, the specific items etc. of the disclosure described in the claims are not limited to the specific components, structures, etc. shown in the following embodiment.

The numbers of at least those members or portions that are denoted by reference signs in the description are at least one except when the numbers are noted as "one" etc. Thus, unless noted as "one" etc., the numbers of such members may be two or larger.

This embodiment is an example in which a seat according to the present disclosure is applied to a seat installed in a vehicle, such as a car (hereinafter referred to as a vehicle seat). The arrows etc. indicating directions are added to the drawings to make the relationships among the drawings easy to understand.

Therefore, the disclosure shown in the present disclosure is not limited to the directions added to the drawings. The directions shown in the drawings are directions in a state where the vehicle seat according to the embodiment is incorporated in a car.

First Embodiment

1. Overview of Vehicle Seat

A vehicle seat 1 includes at least a seat cushion 3 and a seatback 5 as shown in FIG. 1. The seat cushion 3 is a portion that supports the buttocks of a seated person. The seatback 5 is a portion that supports the back of the seated person.

A movable part 7 is provided in a part of at least one of the seat cushion 3 and the seatback 5. The movable part 7 is a member that can move relative to a seat frame 9 from a predetermined neutral position as the center.

In this embodiment, the movable part 7 is provided at least in the seatback 5. Thus, the movable part 7 can shift relative to a back frame 9A. The back frame 9A is a member constituting a framework of the seatback 5.

The movable part 7 is capable of swinging in a seat width direction from a position set on an upper end side of the back frame 9A as the center of swinging. In the following description, "the movable part 7 is in the neutral position" means a state where the center of swinging and the center of gravity of the movable part 7 are located in a common imaginary vertical plane orthogonal to the seat width direction (see FIG. 1).

The movable part 7 is supported by a fixed rail R1 (see FIG. 3) that is curved into an arc shape having the center of curvature at the center of swinging. The fixed rail R1 is fixed to the seat frame 9 (back frame 9A). Movable rails R2 are members that are slidable relative to the fixed rail R1.

2. Shift Restraining Device 2.1 Overview of Shift Restraining Device

Schematic Configuration of Shift Restraining Device

Figure 2:
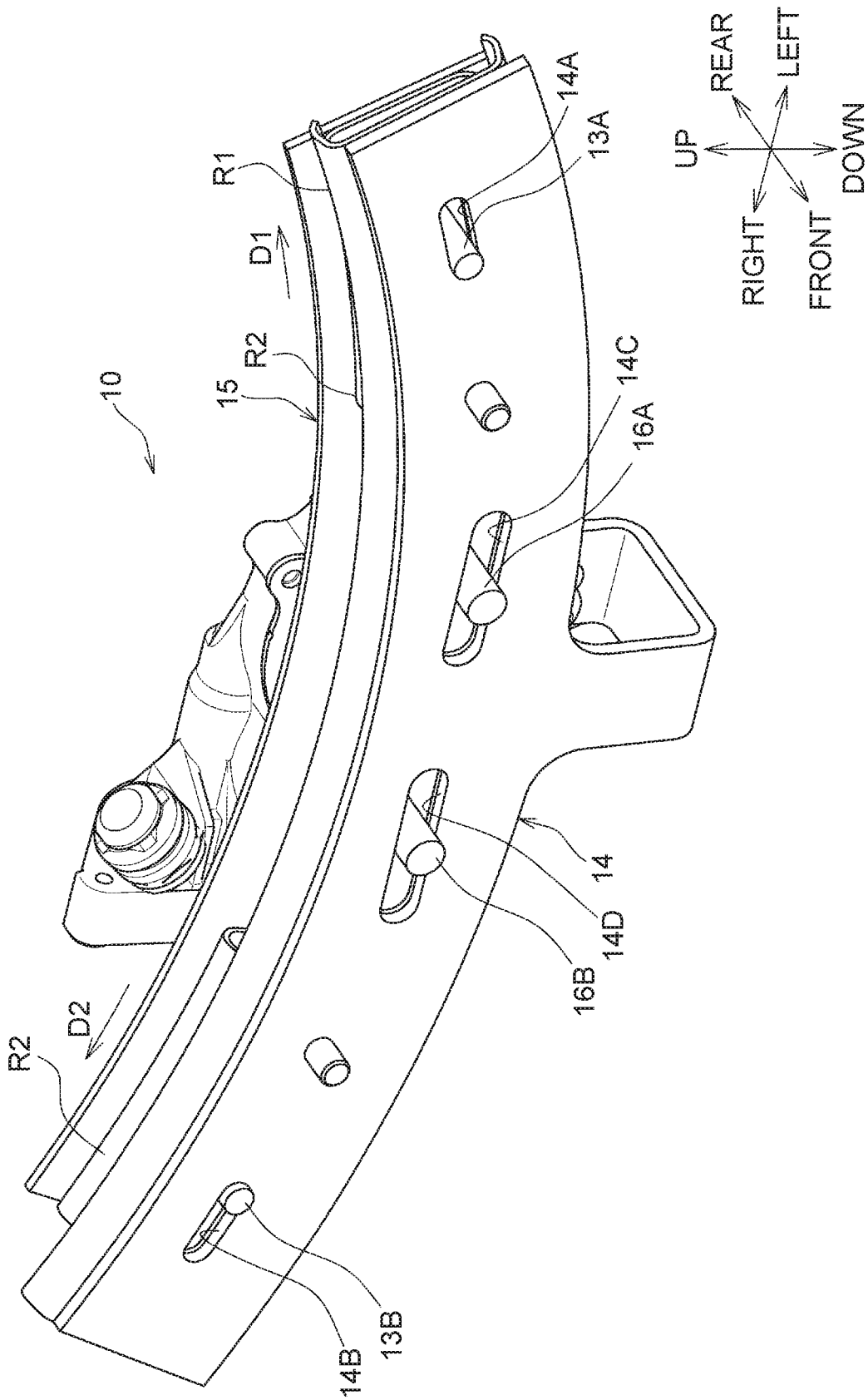
FIG. 2 is a view showing a preloading device according to the first embodiment.
Figure 3:
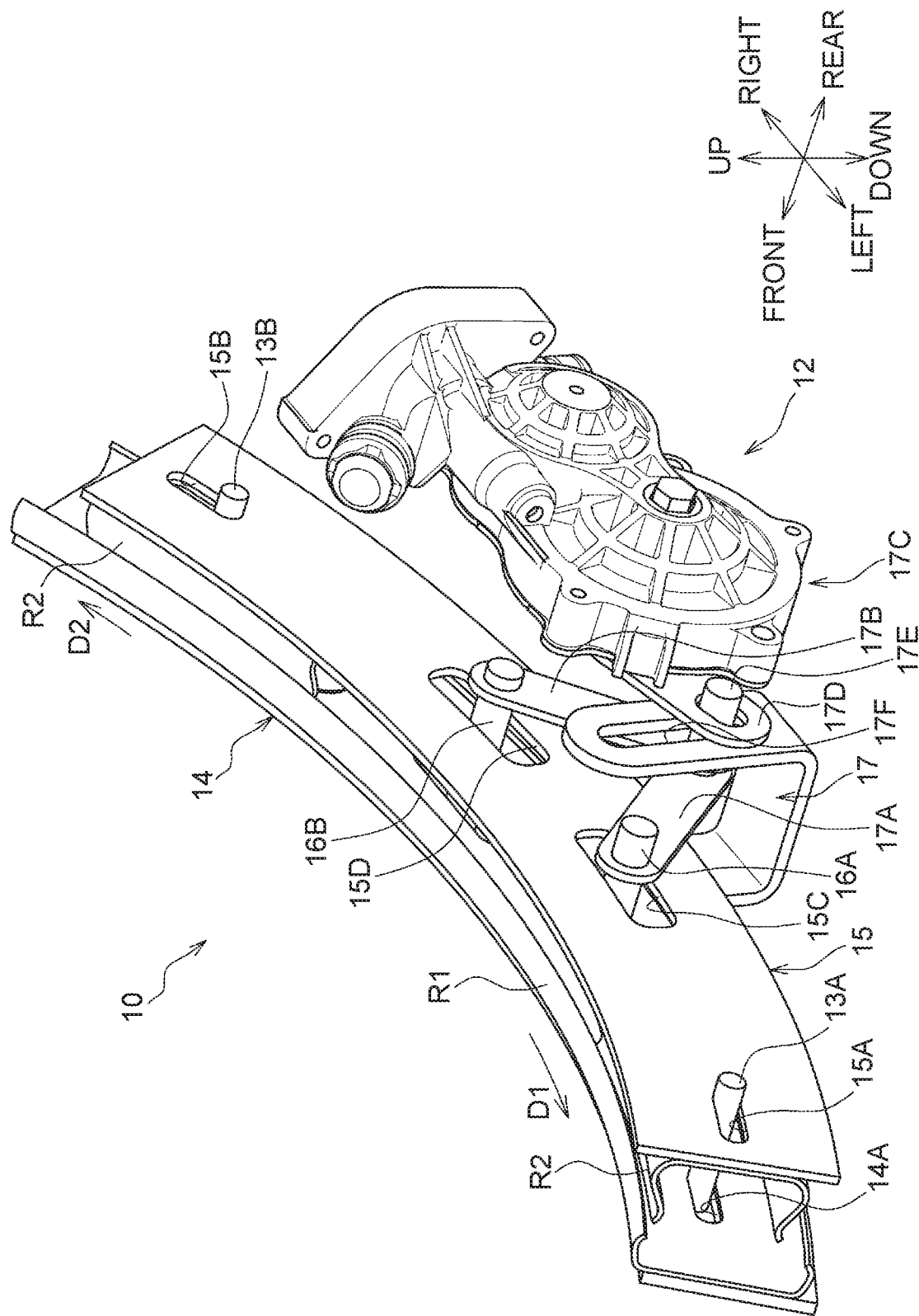
FIG. 3 is a view showing the preloading device according to the first embodiment.
Figure 4:
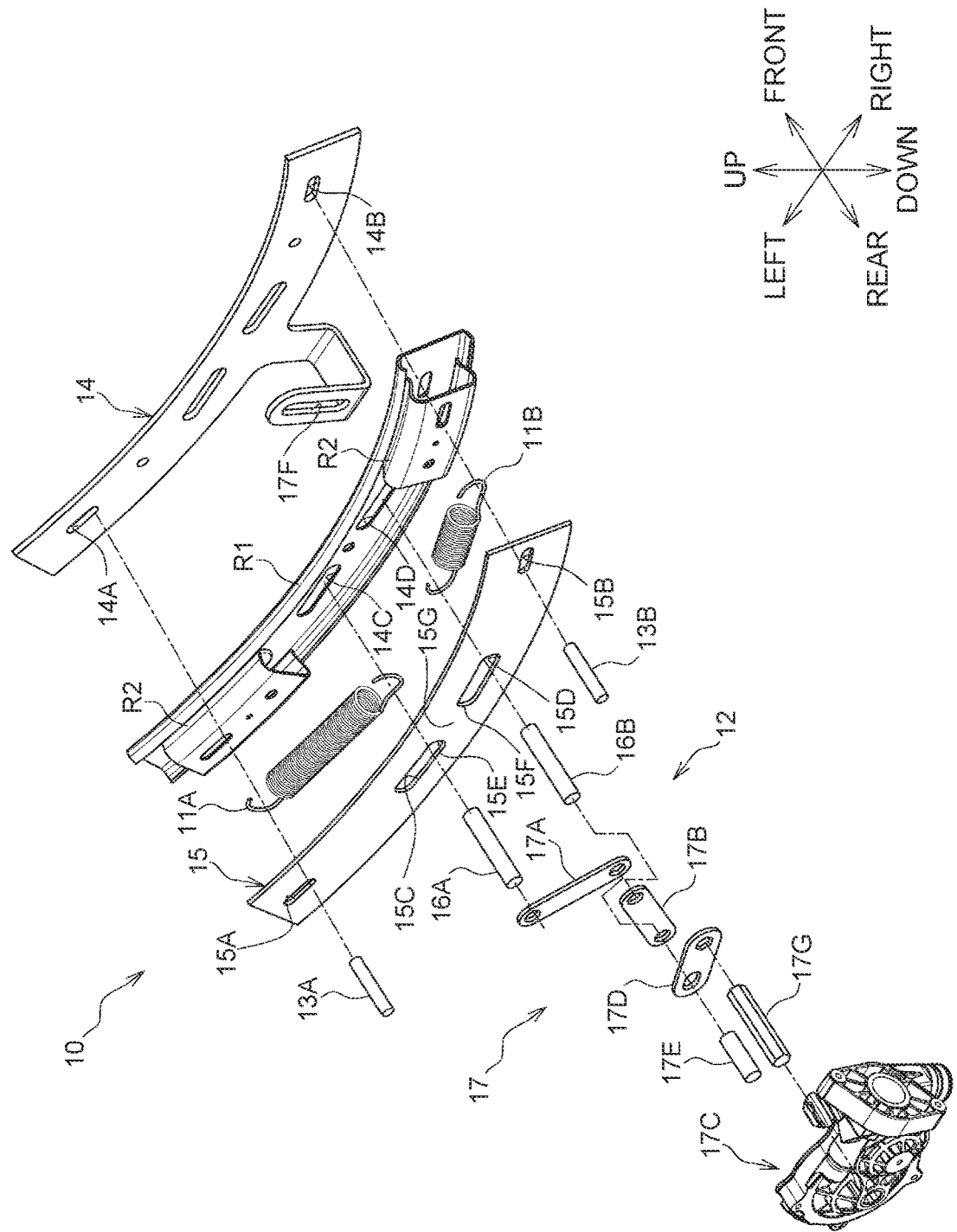
FIG. 4 is an exploded view of the preloading device according to the first embodiment.

A shift restraining device 10 shown in FIG. 2 and FIG. 3 is a device that restrains the movable part 7 from shifting. As shown in FIG. 4, the shift restraining device 10 includes at least a first spring 11A, a second spring 11B, and a preloading device 12.

First Spring and Second Spring

The first spring 11A is an elastic member capable of, when the movable part 7 has shifted in a first direction D1 (see FIG. 3), exerting an elastic force that causes the shifted movable part 7 to shift toward the neutral position. For example, the first direction D1 is a direction in which the movable part 7 shifts leftward.

The second spring 11B is a spring capable of, when the movable part 7 has shifted in a second direction D2 (see FIG. 3), exerting an elastic force that causes the shifted movable part 7 to shift toward the neutral position. The second direction D2 is a direction different from the first direction D1. Specifically, for example, the second direction D2 is a direction in which the movable part 7 shifts rightward.

Coupling Portions of First Spring and Second Spring

The first spring 11A is at one end hung on and anchored to a first movable pin 13A shown in FIG. 4. The one end of the first spring 11A is an end on a forward side in the first direction D1 (in this embodiment, the left end of the first spring 11A).

The second spring 11B is anchored at one end to a second movable pin 13B. The one end of the second spring 11B is an end on a forward side in the second direction D2 (in this embodiment, the right end of the second spring 11B). The first spring 11A and the second spring 11B according to this embodiment are formed by coil springs having the same spring constant.

The first movable pin 13A and the second movable pin 13B are capable of shifting relative to a fixed member 14 and a shifting member 15 in a shifting direction of the movable part 7, i.e., a direction substantially parallel to the seat width direction. The fixed member 14 is a member fixed to the seat frame 9. The fixed member 14 according to this embodiment is integrated with the fixed rail R1 and in this state fixed to the back frame 9A.

The shifting member 15 is a shifting member that shifts integrally with the movable part 7. The shifting member 15 is integrated with the movable rails R2 and in this state coupled to the movable part 7. The fixed member 14 has a first fixed-side elongated hole 14A and a second fixed-side elongated hole 14B both having a shape of an elongated hole. The shifting member 15 has a first movable-side elongated hole 15A and a second movable-side elongated hole 15B both having a shape of an elongated hole.

A longitudinal direction of each of the first fixed-side elongated hole 14A, the second fixed-side elongated hole 14B, the first movable-side elongated hole 15A, and the second movable-side elongated hole 15B coincides with a shifting direction of the shifting member 15, i.e., a direction substantially parallel to the seat width direction. Thus, the first fixed-side elongated hole 14A, the second fixed-side elongated hole 14B, the first movable-side elongated hole 15A, and the second movable-side elongated hole 15B are formed by substantially arc-shaped elongated holes.

The first movable pin 13A is passed through the first fixed-side elongated hole 14A and the first movable-side elongated hole 15A, and is capable of shifting in this state in the longitudinal direction of the first fixed-side elongated hole 14A and the first movable-side elongated hole 15A. The second movable pin 13B is passed through the second fixed-side elongated hole 14B and the second movable-side elongated hole 15B, and is capable of shifting in this state in the longitudinal direction of the second fixed-side elongated hole 14B and the second movable-side elongated hole 15B.

Figure 5:
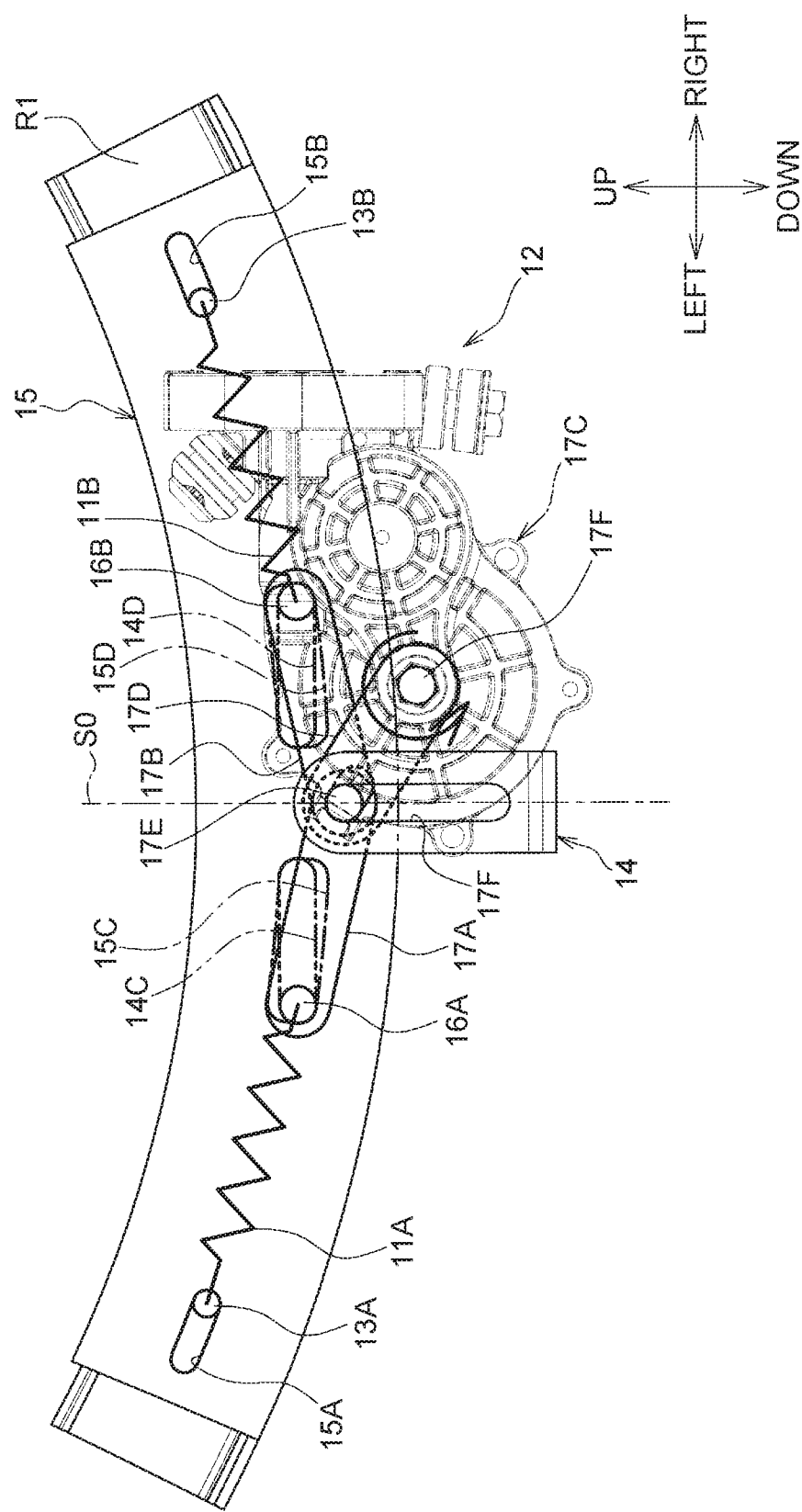
FIG. 5 is a view illustrating the operation of the preloading device according to the first embodiment.

As shown in FIG. 5, in a state where the shifting member 15, i.e., the movable part 7, is in the neutral position, the first movable pin 13A is in contact with an end located closer to the neutral position, of one end and the other end in the longitudinal direction of each of the first fixed-side elongated hole 14A and the first movable-side elongated hole 15A.

In the state where the movable part 7 is in the neutral position, the second movable pin 13B is in contact with an end located closer to the neutral position, of one end and the other end in the longitudinal direction of each of the second fixed-side elongated hole 14B and the second movable-side elongated hole 15B.

Specifically, in the state where the movable part 7 is in the neutral position, the first movable pin 13A is in contact with the right ends of the first fixed-side elongated hole 14A and the first movable-side elongated hole 15A, while the second movable pin 13B is in contact with the left ends of the second fixed-side elongated hole 14B and the second movable-side elongated hole 15B.

Operation of Coupling Portions of First Spring and Second Spring (See FIG. 5)

When the movable part 7 shifts in the first direction D1 (leftward) from the neutral position, the first movable pin 13A that is in contact with the right end of the first movable-side elongated hole 15A shifts leftward inside the first fixed-side elongated hole 14A integrally with the movable part 7, i.e., the shifting member 15.

When the movable part 7 shifts in the first direction D1 (leftward) from the neutral position, the second movable pin 13B remains at the same position since the second movable pin 13B is in contact with the left end of the second fixed-side elongated hole 14B. In this case, the second movable pin 13B relatively shifts rightward relative to the second movable-side elongated hole 15B.

When the movable part 7 shifts in the second direction D2 (rightward) from the neutral position, the second movable pin 13B that is in contact with the left end of the second movable-side elongated hole 15B shifts rightward inside the second fixed-side elongated hole 14B integrally with the shifting member 15.

When the movable part 7 shifts in the second direction D2 (rightward) from the neutral position, the first movable pin 13A remains at the same position since the first movable pin 13A is in contact with the right end of the first fixed-side elongated hole 14A. In this case, the first movable pin 13A relatively shifts leftward relative to the first movable-side elongated hole 15A.

Thus, the first movable pin 13A functions as a first coupling portion that, when the movable part 7 has shifted in the first direction D1, shifts the one end of the first spring 11A so as to follow the movable part 7. The second movable pin 13B functions as a second coupling portion that, when the movable part 7 has shifted in the second direction D2, shifts the one end of the second spring 11B so as to follow the movable part 7.

2.2 Preloading Device

Overview of Preloading Device

The preloading device 12 is a device that changes the initial load (preload) of the first spring 11A and the second spring 11B. The initial load of the first spring 11A is an elastic force exerted on the movable part 7 by the first spring 11A when the movable part 7 is in the neutral position.

The initial load of the second spring 11B is an elastic force exerted on the movable part 7 by the second spring 11B when the movable part 7 is in the neutral position. The preloading device 12 according to this embodiment can change the two initial loads at the same time.

As shown in FIG. 3, the preloading device 12 includes at least a first adjusting pin 16A, a second adjusting pin 16B, and a shift mechanism 17. The first spring 11A is anchored at the other end (in this embodiment, the right end) to the first adjusting pin 16A.

The second spring 11B is anchored at the other end (in this embodiment, the left end) to the second adjusting pin 16B. The shift mechanism 17 is a mechanism that shifts the first adjusting pin 16A and the second adjusting pin 16B in the first direction D1 or the second direction D2.

As shown in FIG. 2, the fixed member 14 has a first fixed hole 14C and a second fixed hole 14D. The first fixed hole 14C is a through-hole which has a shape of an elongated hole and through which the first adjusting pin 16A is inserted. The second fixed hole 14D is a through-hole which has a shape of an elongated hole and through which the second adjusting pin 16B is inserted.

A longitudinal direction of the first fixed hole 14C is substantially parallel to the first direction D1 (the longitudinal direction of the first fixed-side elongated hole 14A). A longitudinal direction of the second fixed hole 14D is substantially parallel to the second direction D2 (the longitudinal direction of the second fixed-side elongated hole 14B). Thus, the first fixed hole 14C and the second fixed hole 14D are symmetrical in position and shape with respect to the imaginary vertical plane including the neutral position.

As shown in FIG. 3, the shifting member 15 has a first movable hole 15C and a second movable hole 15D. The first movable hole 15C is a through-hole through which the first adjusting pin 16A is inserted. The second movable hole 15D is a through-hole through which the second adjusting pin 16B is inserted.

The first adjusting pin 16A is capable of shifting inside the first movable hole 15C in a direction parallel to the first fixed hole 14C. The second adjusting pin 16B is capable of shifting inside the second movable hole 15D in a direction parallel to the second fixed hole 14D.

Shift Mechanism

The shift mechanism 17 includes at least a first link 17A, a second link 17B, and an actuator 17C. The first link 17A is a member that is rotatably coupled at one end to the first adjusting pin 16A.

The second link 17B is a member that is rotatably coupled at one end to the second adjusting pin 16B. The first link 17A and the second link 17B are each rotatably coupled at the other end to an arm 17D of the actuator 17C through a shaft 17E.

The actuator 17C shifts a portion to which the first link 17A and the second link 17B are coupled, i.e., the shaft 17E, in a direction intersecting the longitudinal direction of the first fixed hole 14C. This direction according to the embodiment is parallel to an imaginary vertical plane So including the neutral position (see FIG. 5).

The shift of the shaft 17E is guided by a guide groove 17F. The guide groove 17F is formed by an elongated hole through which the shaft 17E can be passed. The guide groove 17F is provided in the fixed member 14 (see FIG. 4).

The actuator 17C according to this embodiment is a device integrating a speed reducing mechanism and an electric motor. The actuator 17C turns the arm 17D through a shaft 17G (see FIG. 4). The actuator 17C is fixed to the seat frame 9 through the fixed member 14.

2.3 Operation of Shift Restraining Device
Overview of Operation (See FIG. 5)

When the movable part 7 shifts in the first direction D1 (leftward) from the neutral position, the first movable pin 13A shifts in the first direction D1 (leftward) integrally with the shifting member 15 while the second movable pin 13B remains at the same position.

Therefore, when the movable part 7 shifts in the first direction D1 (leftward) from the neutral position, the first spring 11A expands and the elastic force thereof increases. Thus, the first spring 11A exerts a restoring force that restores the movable part 7 to the neutral position.

When the movable part 7 shifts in the second direction D2 (rightward) from the neutral position, the second movable pin 13B shifts in the second direction D2 (rightward) integrally with the shifting member 15 while the first movable pin 13A remains at the same position.

Therefore, when the movable part 7 shifts in the second direction D2 (rightward) from the neutral position, the second spring 11B expands and the elastic force thereof increases. Thus, the second spring 11B exerts a restoring force that restores the movable part 7 to the neutral position.

To sum up, whenever the movable part 7 swings in the seat width direction from the neutral position, the elastic force of the first spring 11A or the second spring 11B tries to restore the movable part 7 to the neutral position. In other words, the first spring 11A and the second spring 11B generate restoring forces for retaining the movable part 7 in the neutral position.

Operation of Preloading Device

Figure 6:
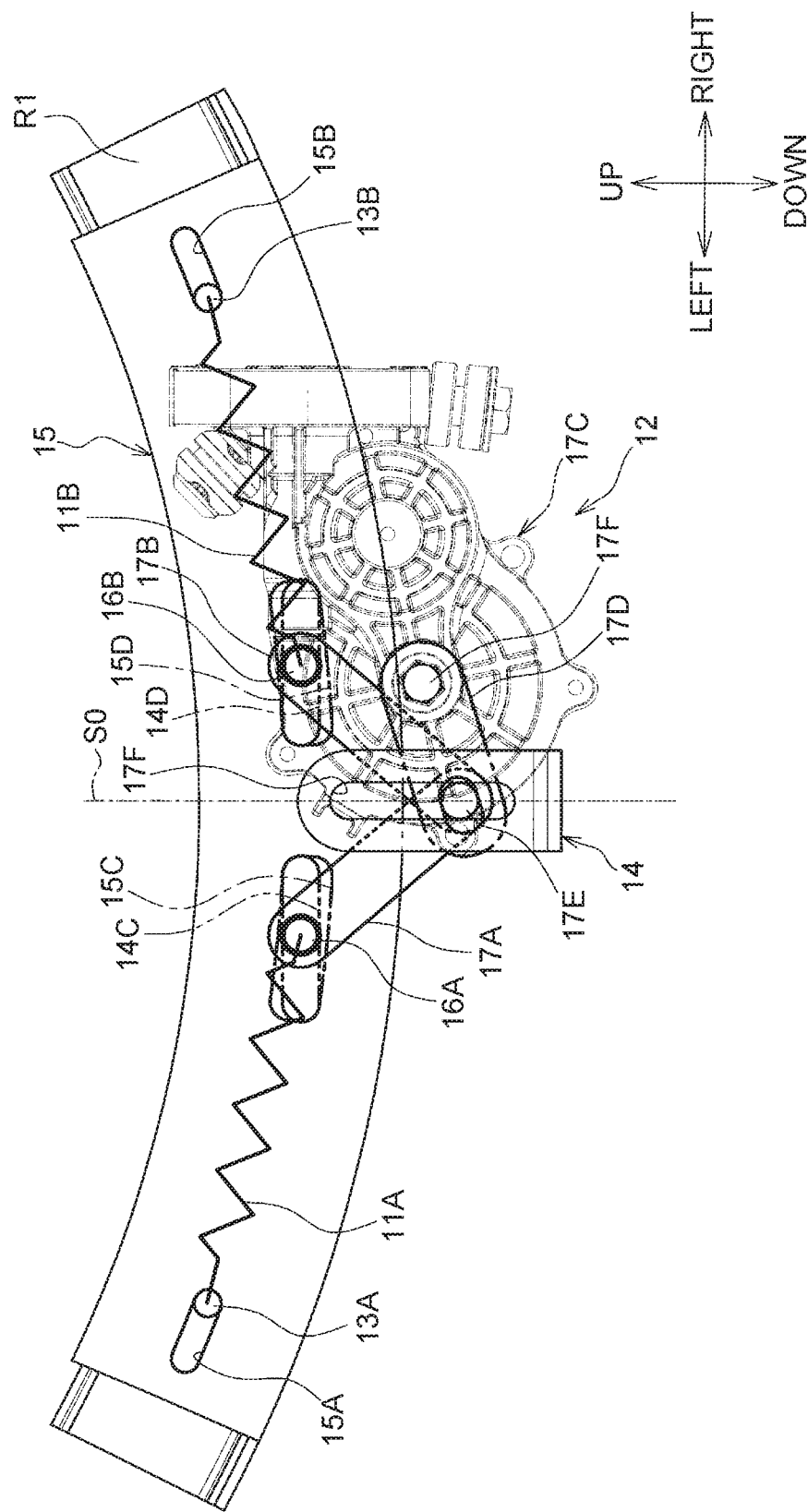
FIG. 6 is a view illustrating the operation of the preloading device according to the first embodiment.

As shown in FIG. 5 to FIG. 7, when the arm 17D swings to shift the first link 17A and the second link 17B, the distance between the first adjusting pin 16A and the second adjusting pin 16B changes so as to increase or decrease.

Therefore, when the arm 17D swings while the movable part 7 is in the neutral position, the first adjusting pin 16A and the second adjusting pin 16B shift relative to the first movable pin 13A and the second movable pin 13B in conjunction with this swinging. Thus, when the arm 17D swings, the initial load of the first spring 11A and the initial load of the second spring 11B change in conjunction with this swinging.

The movable part 7 shifts in the direction of a load acting on the movable part 7, such as an inertial force, when this load exceeds the initial load of the first spring 11A or the initial load of the second spring 11B. Accordingly, a larger initial load makes it difficult for the movable part 7 to shift, and a smaller initial load makes it easy for the movable part 7 to shift.

Locking Function

A locking function is a function of restraining the shifting member 15 from shifting relative to the fixed member 14. Therefore, when this locking function is fulfilled, the movable part 7 is restrained from shifting relative to the seat frame 9.

As shown in FIG. 7, when the locking function is fulfilled, the first adjusting pin 16A comes into contact with an end 15E of the first movable hole 15C while the second adjusting pin 16B comes into contact with an end 15F of the second movable hole 15D.

The end 15F of the second movable hole 15D is one of ends of the second movable hole 15D that is located at a position symmetrical to the position of the end 15E of the first movable hole 15C with respect to the imaginary vertical plane So including the neutral position. Thus, when the end 15E is the right end of the first movable hole 15C, the end 15F is the left end of the second movable hole 15D.

When the end 15E is the left end of the first movable hole 15C, the end 15F is the right end of the second movable hole 15D. In this embodiment, when the locking function is fulfilled, the first adjusting pin 16A is located at a position farthest away from the first movable pin 13A while the second adjusting pin 16B is located at a position farthest away from the second movable pin 13B.

As a result, a portion 15G (see FIG. 4) of the shifting member 15 that is located between the end 15E and the end 15F is held between the first adjusting pin 16A and the second adjusting pin 16B, so that the shifting member 15 is restrained from shifting.

3. Features of Vehicle Seat According to Embodiment

The vehicle seat 1 includes the preloading device 12. The preloading device 12 is capable of changing at least one of the initial load exerted on the movable part 7 by the first spring 11A when the movable part 7 is in the neutral position and the initial load exerted on the movable part 7 by the second spring 11B when the movable part 7 is in the neutral position. Thus, the movable part 7 can be prevented from shifting with higher-than-necessary sensitivity.

The preloading device 12 is capable of changing at least one of the position of the other end of the first spring 11A and the position of the other end of the second spring 11B. This allows the initial load of at least one of the first spring 11A and the second spring 11B to be easily changed.

The preloading device 12 is configured to be able to fulfill the locking function for restraining the shifting member 15 from shifting relative to the fixed member 14. Thus, the movable part 7 can be restrained from shifting, and therefore can be prevented from shifting with higher-than-necessary sensitivity.

To fulfill the locking function, the preloading device 12 brings the first adjusting pin 16A into contact with the end 15E of the first movable hole 15C and brings the second adjusting pin 16B into contact with the end 15F of the second movable hole 15D. Thus, the locking function is fulfilled with the first adjusting pin 16A and the second adjusting pin 16B restraining the movable part 7 from shifting.

Other Embodiments

The vehicle seat 1 according to the above embodiment has the movable part 7 provided in the seatback 5. However, the disclosure disclosed in this specification is not limited to this example. For example, the present disclosure may have a configuration in which the movable part 7 is provided in the seat cushion 3, or a configuration in which the movable part 7 is provided in both the seat cushion 3 and the seatback 5.

In the above embodiment, coil springs are used as the first spring 11A and the second spring 11B. However, the disclosure disclosed in this specification is not limited to this example. In the present disclosure, the first spring 11A and the second spring 11B may be formed by other springs, for example, helical torsion springs or spiral springs.

In the above embodiment, the first spring 11A and the second spring 11B are each coupled at one end to the movable part 7 through the shifting member 15 and coupled at the other end to the fixed member 14, and the other ends of the first spring 11A and the second spring 11B are shifted by the shift mechanism 17.

However, the disclosure disclosed in this specification is not limited to this example. For example, the present disclosure may have a configuration in which the one end of the first spring 11A and the one end of the second spring 11B are shifted relative to the shifting member 15. In this configuration, the other ends may be configured as in the above embodiment or configured to remain at the same positions relative to the fixed member 14.

In the above embodiment, the locking function can be fulfilled. However, the disclosure disclosed in this specification is not limited to this example. For example, the present disclosure may have a configuration in which the locking function is omitted.

In the above embodiment, when the locking function is fulfilled, the first adjusting pin 16A comes into contact with the end 15E of the first movable hole 15C while the second adjusting pin 16B comes into contact with the end 15F of the second movable hole 15D. However, the disclosure disclosed in this specification is not limited to this example.

For example, the present disclosure may have a configuration in which, when the locking function is fulfilled, (a) the first adjusting pin 16A comes into contact with the end of the first movable hole 15C opposite from the end 15E while the second adjusting pin 16B comes into contact with the end of the second movable hole 15D opposite from the end 15F, or (b) a bar-like member engages with the shifting member 15 or the movable part 7.

In the above embodiment, the vehicle seat according to the present disclosure is applied to a car. However, the application of the disclosure disclosed in this specification is not limited to this example, and the disclosure is also applicable to seats used in vehicles such as railroad vehicles, ships, and airplanes, as well as to stationary seats used in theaters, houses, etc.

Moreover, embodiments of the present disclosure are not limited to those described above but also include any embodiments that are consistent with the gist of the disclosure described in the above embodiments. Thus, a configuration combining at least two embodiments of the above embodiments, or a configuration in which one of the constituent elements of the disclosure shown in the above embodiments is omitted, may be adopted.

What is claimed is:

1. A vehicle seat installed in a vehicle, the vehicle seat comprising:
    a seatback;
    a seat cushion;
    a seat frame;
    a movable part that is provided in a part of at least one of the seatback and the seat cushion and configured to move relative to the seat frame from a predetermined neutral position as a center;
    a first spring capable of, when the movable part has shifted in a first direction, generating such an elastic force as causes the movable part to shift toward the neutral position;
    a second spring capable of, when the movable part has shifted in a second direction different from the first direction, generating such an elastic force as causes the movable part to shift toward the neutral position; and
    a preloading device configured to change at least one of the elastic force exerted on the movable part by the first spring when the movable part is in the neutral position and the elastic force exerted on the movable part by the second spring when the movable part is in the neutral position.

2. The vehicle seat according to claim 1, further comprising:
    a first coupling portion that, when the movable part has shifted in the first direction, shifts a first end of the first spring so as to follow the movable part; and
    a second coupling portion that, when the movable part has shifted in the second direction, shifts a first end of the second spring so as to follow the movable part, wherein
    the preloading device is configured to change at least one of a position of a second end of the first spring and a position of a second end of the second spring.

3. The vehicle seat according to claim 2, further comprising:
    a shifting member that shifts integrally with the movable part; and
    a fixed member that is fixed to the seat frame, wherein
    the preloading device is configured to restrain the shifting member from shifting relative to the fixed member.

4. The vehicle seat according to claim 3, wherein
    the preloading device includes a first adjusting pin to which the first spring is anchored at the second end of the first spring, a second adjusting pin to which the second spring is anchored at the second end of the second spring, and a shift mechanism configured to shift the first adjusting pin and the second adjusting pin in the first direction or the second direction;
    the shifting member has a first movable hole which has a shape of an elongated hole and through which the first adjusting pin is inserted, and a second movable hole which has a shape of an elongated hole and through which the second adjusting pin is inserted;
    the second movable hole is provided at a position symmetrical to a position of the first movable hole with respect to a vertical plane including the neutral position; and
    the preloading device is configured to restrain the shifting member from shifting relative to the fixed member by the first adjusting pin into contact with an end of the first movable hole and bring the second adjusting pin into contact with an end of the second movable hole that is an end symmetrical in position to the end of the first movable hole with respect to the vertical plane including the neutral position.

5. The vehicle seat according to claim 4, wherein
the fixed member has a first fixed hole which has a shape of an elongated hole and through which the first adjusting pin is inserted, and a second fixed hole which has a shape of an elongated hole and through which the second adjusting pin is inserted;
the first fixed hole extends in a direction parallel to the first movable hole;
the second fixed hole is provided at a position symmetrical to a position of the first fixed hole with respect to the vertical plane including the neutral position;
the shift mechanism includes a first link rotatably coupled at a first end of the first link to the first adjusting pin, a second link rotatably coupled at a first end of the second link to the second adjusting pin, and an actuator to which the first link and the second link are each rotatably coupled at a second end of each of the first and second links; and
the actuator is configured to shift a portion to which the first link and the second link are each coupled at the second ends, in a direction intersecting a longitudinal direction of the first fixed hole.

6. The vehicle seat according to claim 5, wherein
the shift mechanism includes a shaft; and
the first link and the second link are each coupled at the second end of each of the first and second links to the actuator through the shaft, and the actuator is configured to shift the shaft in the direction intersecting the longitudinal direction of the first fixed hole.

\* \* \* \* \*